(12) United States Patent
Wu et al.

(10) Patent No.: US 12,119,547 B2
(45) Date of Patent: Oct. 15, 2024

(54) HIGH RELIABILITY PORTABLE DEVICE

(71) Applicant: EMERGING DISPLAY TECHNOLOGIES CORP., Kaohsiung (TW)

(72) Inventors: Han-Tsung Wu, Kaohsiung (TW); Chao-Ping Wu, Kaohsiung (TW); Po-Tsun Liu, Kaohsiung (TW)

(73) Assignee: EMERGING DISPLAY TECHNOLOGIES CORP., Kaohsiung (TW)

( * ) Notice: Subject to any disclaimer, the term of this patent is extended or adjusted under 35 U.S.C. 154(b) by 223 days.

(21) Appl. No.: 17/842,034

(22) Filed: Jun. 16, 2022

(65) Prior Publication Data
US 2023/0411840 A1    Dec. 21, 2023

(51) Int. Cl.
*H01Q 1/42*    (2006.01)
*H01Q 1/24*    (2006.01)
*H04B 5/43*    (2024.01)

(52) U.S. Cl.
CPC ............... *H01Q 1/42* (2013.01); *H01Q 1/24* (2013.01); *H04B 5/43* (2024.01)

(58) Field of Classification Search
CPC ............... H01Q 1/42; H01Q 1/24; H04B 5/43
See application file for complete search history.

(56) References Cited

U.S. PATENT DOCUMENTS

| | | | |
|---|---|---|---|
| 2017/0006738 A1* | 1/2017 | Lee | H05K 7/20963 |
| 2017/0047791 A1* | 2/2017 | Jang | H04B 5/26 |
| 2018/0286924 A1* | 10/2018 | Lee | H10K 59/871 |
| 2021/0152680 A1* | 5/2021 | Lee | H04B 5/26 |
| 2021/0167487 A1* | 6/2021 | Varma | H01Q 21/28 |
| 2021/0168230 A1* | 6/2021 | Baker | G06F 1/1698 |
| 2021/0210836 A1* | 7/2021 | Jang | H01Q 17/001 |

* cited by examiner

*Primary Examiner* — Hai V Tran
(74) *Attorney, Agent, or Firm* — Birch, Stewart, Kolasch & Birch, LLP

(57) ABSTRACT

The present invention provides a high reliability portable device, including a cover board, a touch module layered with the cover board, a display module layered with the touch module, and an antenna module layered with the cover board; the antenna module includes an antenna layer with an antenna frame, a first conductive layer with a first conductive frame conductive with the antenna frame, and a protection layer with a protection frame covering the antenna frame and the first conductive frame; the first conductive frame is tougher than the antenna frame, therefore even if the antenna frame is broken, the first conductive layer would still be intact to transmit and receive wireless signals.

16 Claims, 16 Drawing Sheets

HIGH RELIABILITY PORTABLE DEVICE

BACKGROUND OF THE INVENTION

1. Field of the Invention

The present invention relates to a portable device, particularly a high reliability portable device.

2. Description of the Related Art

In modern times, most smart portable devices such as smart phones, tablet computers, or smart watches have become a crucial part of a person's daily life. These smart portable devices become personal devices almost usually featuring touch screens. By using touch screens, users are more enticed to interact with these smart portable devices. These smart portable devices with touch screens may also be called touchscreen devices.

Near-Field Communication (NFC) is a type of wireless communication protocol between two electronic devices, with one of the electronic devices usually being a mobile device such as a smart phone, a tablet computer, or a smart watch. The NFC uses wireless signals generated by an NFC antenna for wireless communication, and as such, wireless signals are often transferred to a signal receiving antenna within centimeters of distance.

Moreover, most smart portable devices nowadays utilize NFC capabilities to communicate with another electronic device. The smart portable devices would transmit or receive an NFC signal through the NFC antenna as part of communication.

The smart portable devices usually utilize the NFC to transmit identification signals of users for verifying identities of the users. Once the user's identity is verified by the identification signal by NFC, the user is authorized to execute further actions such as making digital payments, making data transfers, or accessing private data. In other words, most smart portable devices use NFC capabilities to grant the user authorized access for further actions, and the NFC capabilities are a crucial function for the smart portable devices.

However, the NFC antenna is very fragile in current smart portable devices. The NFC antenna is a single layered loop, and when the single layered loop is broken, the NFC antenna is also broken. Most current NFC antennas are cooper wires or silver wires externally mounted on the smart portable devices, and as a result, most current NFC antennas are prone to damaging cuts, external normal forces, or corrosions. In other words, most current NFC antennas are easily exposed to hazardous factors that can easily break the single layered loop of the NFC antenna. For this reason, the current NFC antennas in the smart portable devices are not very reliable. Once the singled layered loop is broken, the NFC antenna in the smart portable devices would cease to function, and the smart portable device would lose NFC capabilities to verify user identity.

SUMMARY OF THE INVENTION

The present invention provides a high reliability portable device. The high reliability portable device includes:
  a cover board;
  a touch module, layered with the cover board;
  a display module, layered with the touch module;
  an antenna module, layered with the cover board, and comprising:
    an antenna layer, having an antenna frame;
    a first conductive layer, having a first conductive frame; wherein the first conductive frame is conductive with the antenna frame; wherein the first conductive frame is tougher than the antenna frame; and
    a protection layer, having a protection frame; wherein the protection frame covers the antenna frame and the first conductive frame.

Since the first conductive frame is tougher than the antenna frame, the first conductive frame would most likely still be intact even when the antenna frame is broken. By having the first conductive frame conducting with the antenna frame, even when the antenna frame is broken, electrons originally oscillating inside the antenna frame would still be able to maintain oscillations by emitting electromagnetic waves through the first conductive frame.

In an embodiment of the present invention, the high reliability portable device of the present invention is able to emit Near-Field Communication (NFC) signals through the antenna frame and the first conductive frame to verify a user identity. By having the first conductive frame, even if the antenna frame is broken, the first conductive frame would still reliably emit the NFC signals to verify the user identity, functioning like an additional antenna frame.

DETAILED DESCRIPTION OF THE INVENTION

The present invention provides a high reliability portable device. The high reliability portable device includes a cover board, a touch module, a display module, and an antenna module. The high reliability portable device of the present invention is highly reliable because the antenna module particularly is highly reliable. Namely, the antenna module of the present invention is able to withstand external forces or external conditions, such as dampness or corrosion, better than antennas of touchscreen devices mentioned in prior arts.

Figure 1:
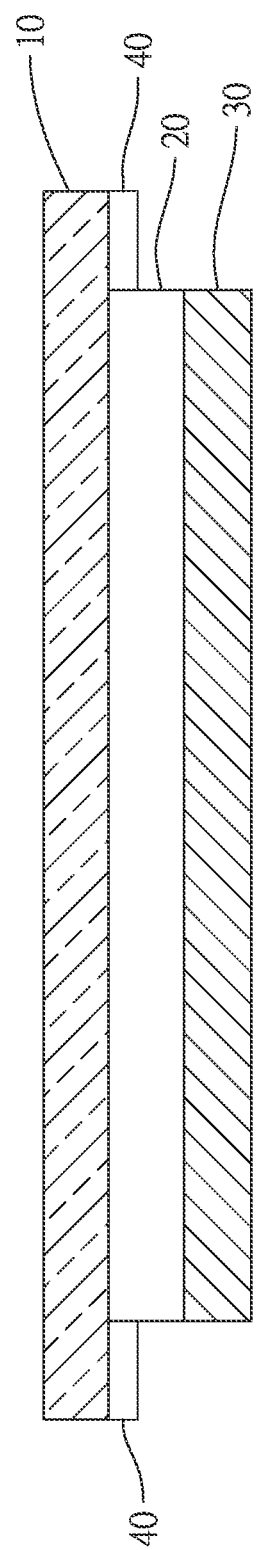
FIG. 1 is a perspective view of the present invention.

With reference to FIG. 1, in a perspective view of the present invention, the cover board 10, the touch module 20, the display module 30, and the antenna module 40 are layered together. More particularly, the touch module 20 is layered with the cover board 10, the display module 30 is layered with the touch module 20, and the antenna module 40 is also layered with the cover board 10.

Figure 2:
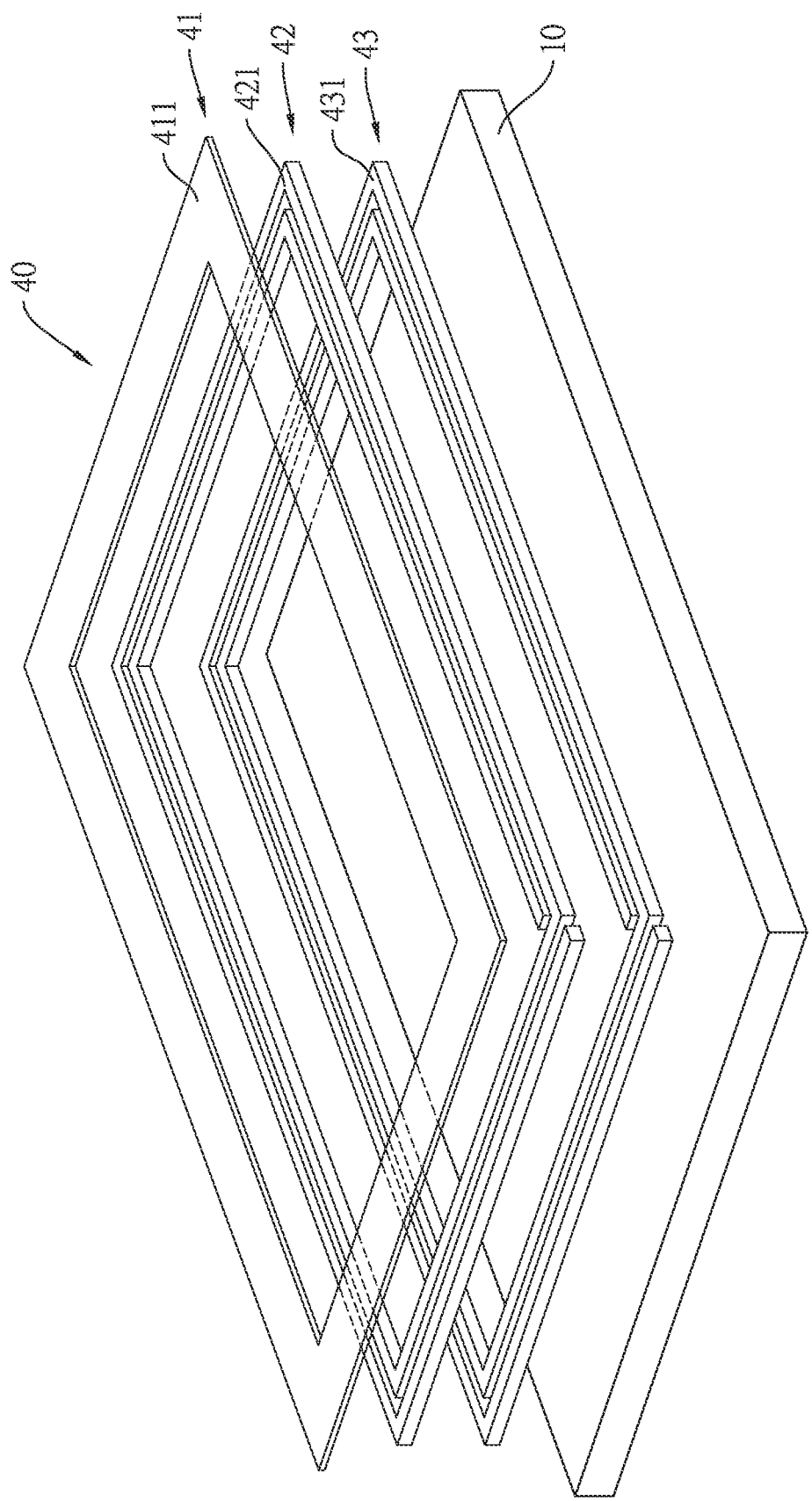
FIG. 2 is an exploded perspective view of an antenna module of the present invention.

With reference to FIG. 2, in an exploded perspective view of the present invention, the antenna module 40 further includes a protection layer 41, an antenna layer 42, and a first conductive layer 43. The antenna layer 42 is a loop antenna, and therefore the antenna layer 42 has an antenna frame 421. The protection layer 41 has a protection frame 411, and the first conductive layer 43 also has a first conductive frame 431. The protection frame 411 and the first conductive frame 431 match in shape with the antenna frame 421, and the protection frame 411 covers the antenna frame 421 and the first conductive frame 431.

The first conductive frame 431 is conductive with the antenna frame 421, and also the first conductive frame 431 is tougher than the antenna frame 421. In other words, the first conductive frame 431 is made of a conductive material with higher toughness than the antenna frame 421. The toughness here refers to a material's ability to withstand external force, as commonly defined in material science. Therefore, by having the first conductive frame 431 tougher than the antenna frame 421, the first conductive frame 431 would withstand external force better than the antenna frame 421 without breaking. Toughness is also defined by an area under a strain-stress curve of a material. The strain-stress curve of a material is mapped to identify how the material reacts to strain and stress acting upon the material.

Apart from conducting with the antenna frame 421, the first conductive frame 431 also contacts an insulator layer. In an embodiment of the present invention as shown in FIGS. 1 and 2, the first conductive frame 431 contacts the cover board 10.

The protection layer 41 covers the antenna layer 42 and the first conductive layer 43, so as to protect the antenna layer 42 and the first conductive layer 43 from external forces or external conditions such as dampness or corrosion. Namely, the protection layer 41 helps absorbing impact from an external force, such as absorbing force of dropping the high reliability portable device from a height, and the protection layer 41 also helps sealing the antenna layer 42 and the first conductive layer 43 from highly oxidizing environment, such as preventing sweat from humans from contacting the antenna layer 42 and the first conductive layer 43. If human sweat, something that is both wet and corrosive to circuits, contacts the antenna layer 42 or the first conductive layer 43, water and salts in sweat will quickly degrade and oxidize the respective layers, damaging the antenna layer 42 or the first conductive layer 43.

In prior arts, an antenna made out of silver paste would be highly susceptible to cuts and cracks caused by the aforementioned external force or external environment. Such cuts and cracks would create open circuit in the antenna layer, stopping electrons from oscillating as intended to generate the NFC signals. Here in the present invention, the antenna layer 42 is protected by the protection layer 41, and further strengthened by the first conductive layer 43. Since the first conductive layer 43 is conductive with the antenna layer 42, the first conductive layer 43 and the antenna layer 42 are electrically connected, and apart from electrons oscillating in the antenna layer 42, electrons also oscillate within the first conductive layer 43 to generate the NFC signals. As a result, the present invention ensures the high reliability portable device as a whole fully functions to emit and receive wireless signals with the first conductive layer 43, and thus ensures the high reliability portable device is indeed highly reliable, or at least more reliable than the touchscreen devices mentioned in prior arts.

In the following paragraphs, multiple embodiments of the present invention are presented to demonstrate some possible applications of the present invention.

Figure 3:
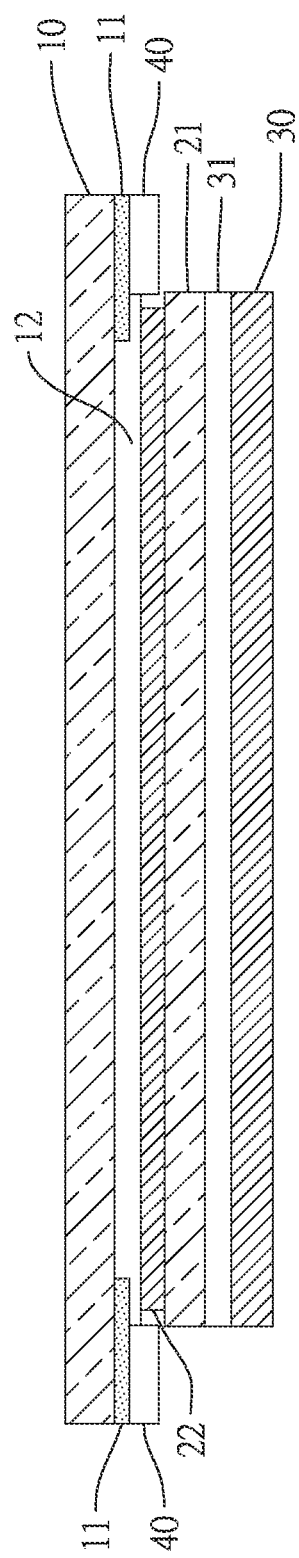
FIG. 3 is a perspective view of a first embodiment of the present invention.

With reference to FIG. 3, apart from the said cover board 10, the touch module 20, the display module 30, and the antenna module 40, a first embodiment of the present invention further includes a block frame 11, a first adhesive 12, and a second adhesive 31. The touch module 20 further includes a touch module board 21 and touch sensors 22.

In the embodiment, the touch module 20 is mounted between the display module 30 and the cover board 10. The touch sensors 22 are mounted on the touch module board 21, on a side facing the cover board 10.

The first adhesive 12 is layered between the cover board 10 and the touch module 20. The second adhesive 31 is layered between the display module 30 and the touch module 20. The block frame 11 is mounted on an inner surface of the cover board 10, and the block frame 11 is located at a rim of the cover board 10. The antenna module 40 is mounted on an inner surface of the block frame 11. In other words, on a side of the block frame 11 known as an outer surface of the block frame 11, the block frame 11 is contacting the inner surface of the cover board 10. On an opposite side of the block frame 11 known as the inner surface of the block frame 11, the block frame 11 is contacting the antenna module 40. The inner surface of the cover board 10 refers to a surface of the cover board 10 facing the display module 30. The inner surface of the cover board 10 faces the same direction as the inner surface of the block frame 11.

The block frame 11 covers wiring from the touch module 20, the antenna module 40, and the display module 30 to a processing module of the high reliability portable device. The processing module is omitted in figures as the processing module only relates loosely to the present invention.

Since the block frame 11 is often just a black thin film mounted on the cover board 10 for cosmetic purposes, in other embodiments of the present invention, the antenna module 40 is directly mounted on the cover board 10 without mounting on the block frame 11.

The antenna module 40 is fitted to emit and receive Near-Field Communication (NFC) signals in concentric and looped circuits. The first conductive layer is looping under the antenna layer, to boost strength of NFC signals generated by the antenna layer.

Figure 4:
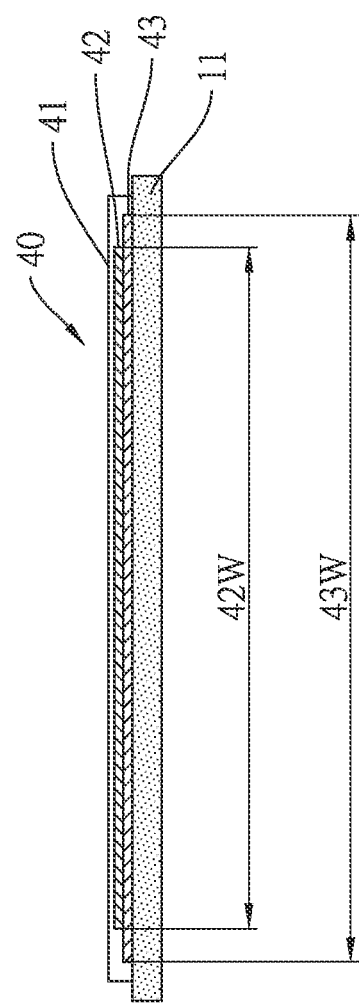
FIG. 4 is a perspective view of the antenna module in the first embodiment of the present invention.

With reference to FIG. 4, the said antenna module 40 includes the protection layer 41, the antenna layer 42, and the first conductive layer 43. More particularly, the first conductive layer 43 is layered between the antenna layer 42 and the block frame 11. The block frame 11 and the protection layer 41 together envelope the antenna layer 42 and the first conductive layer 43.

The first conductive layer 43 has a first line width 43W, and the antenna layer 42 has an antenna line width 42W. In this embodiment, the first line width 43W is greater than the antenna line width 42W.

Furthermore, in this embodiment, the antenna frame 421 is made out of silver paste, and the first conductive frame 431 is an indium tin oxide (ITO) frame.

Figure 5:
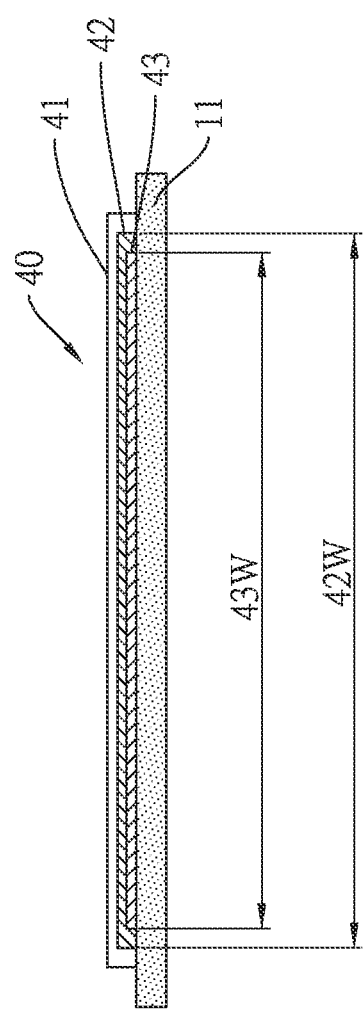
FIG. 5 is a perspective view of the antenna module in a second embodiment of the present invention.

With reference to FIG. 5, in a second embodiment of the present invention, the antenna line width 42W is greater than the first line width 43W, and the antenna frame 421 covers the first conductive frame 431. In other words, the antenna frame 421 and the block frame 11 together envelope the first conductive frame 431.

In this embodiment, the first conductive layer 43 is a metallic frame instead of the ITO frame. The metallic frame is, for example, copper wires, aluminum wires, or silver wires looping under the antenna frame 421, to boost strength of NFC signals generated by the antenna frame 421.

Figure 6:
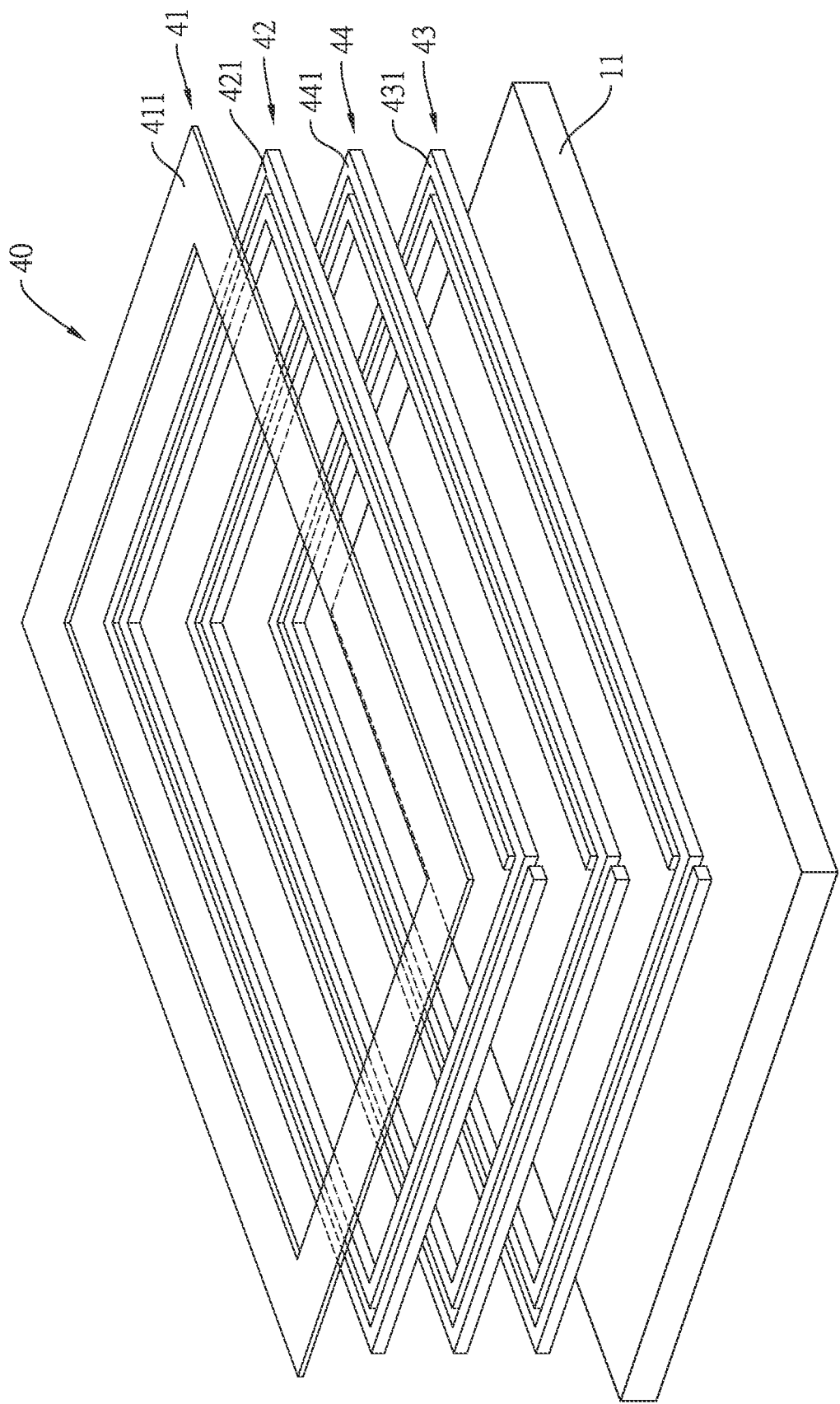
FIG. 6 is an exploded perspective view of the antenna module in a third embodiment of the present invention.

With reference to FIG. 6, in an exploded perspective view of the present invention, a third embodiment of the present invention further includes a second conductive layer 44. The second conductive layer 44 has a second conductive frame 441, and the second conductive frame 441 is mounted between the antenna frame 421 and the first conductive frame 431. Apart from covering the antenna frame 421 and the first conductive frame 431, the protection frame 411 also further covers the second conductive frame 441. The insulator layer that the first conductive frame 431 contacts with, in this case, is the block frame 11.

Figure 7:
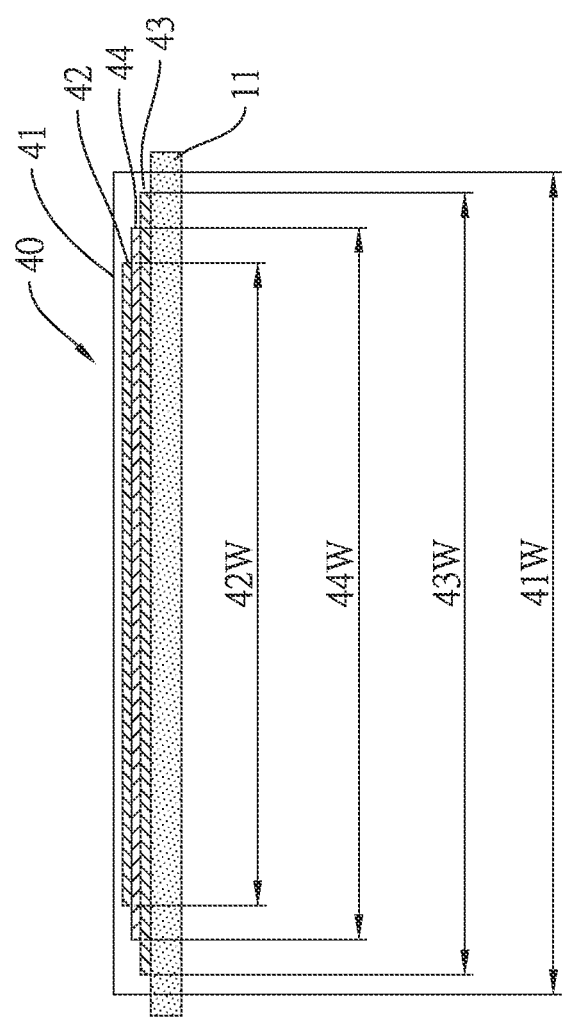
FIG. 7 is another perspective view of the antenna module in the third embodiment of the present invention.

With reference to FIG. 7, the second conductive frame 441 has a second line width 44W, and in this embodiment, the second line width 44W is greater than the antenna line width 42W, and the first line width 43W is greater than the second line width 44W.

More particularly, in this embodiment, the protection frame 411 has a protection line width 41W. The protection line width 41W is greater than the first line width 43W. The protection line width 41W subtracted by the first line width 43W equals about 0.2 millimeters (mm) to 2.0 mm. The first line width 43W subtracted by the second line width 44W equals about 2 microns (μm) to 10 μm. The second line width 44W subtracted by the antenna line width 42W equals about 0.2 mm to 1.0 mm. Please note that the widths shown in figures are scale free. The figures presented here are intended for showing a perspective view of the layout, rather than accurately presenting various line widths in true scales. This also applies to all other figures of other embodiments presented for the present invention.

In other words, on a side of the loop antenna, a spacing of 0.1 mm to 1.0 mm exists between the protection frame 411 and the first conductive frame 431. Similarly, a spacing of 1 μm to 5 μm exists between the first conductive frame and the second conductive frame 441, and a spacing of 0.1 mm to 0.5 mm exists between the second conductive frame 441 and the antenna frame 421.

Furthermore, the first conductive frame 431 is the metallic frame, and the second conductive frame 441 is the ITO frame.

Figure 8:
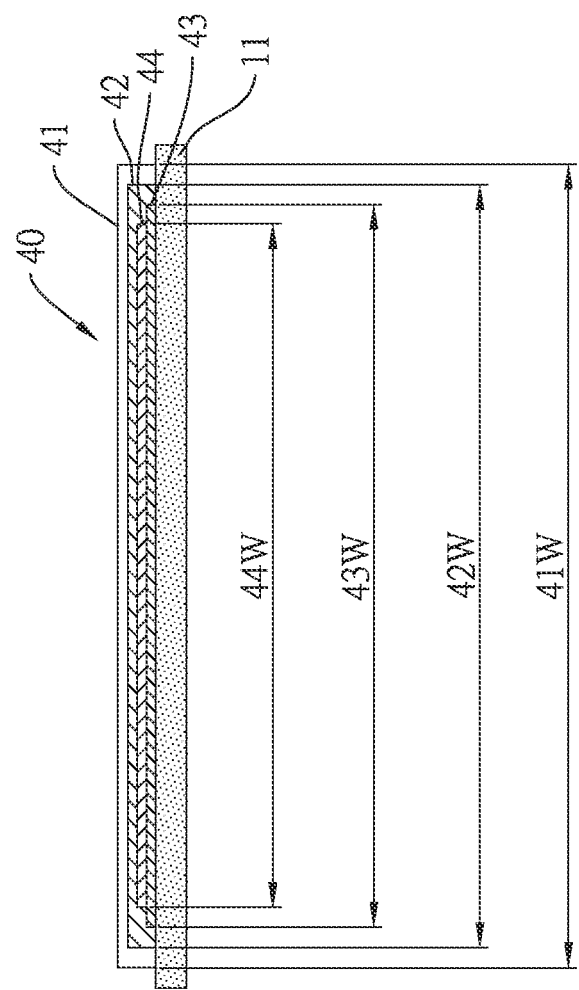
FIG. 8 is a perspective view of the antenna module in a fourth embodiment of the present invention.

With reference to FIG. 8, in a fourth embodiment of the present invention, the antenna frame 421 covers both the first conductive frame 431 and the second conductive frame 441. The first line width 43W is greater than the second line width 44W, and the antenna line width 42W is greater than the first line width 43W. In other words, the antenna frame 421 and the block frame 11 envelope both the first conductive frame 431 and the second conductive frame 441.

More particularly, in this embodiment, the protection line width 41W subtracted by the antenna line width 42W equals about 0.2 mm to 2.0 mm. The antenna line width 42W subtracted by the first line width 43W equals about 0.2 mm to 1.0 mm. The first line width 43W subtracted by the second line width 44W equals about 2 μm to 10 μm.

In other words, on a side of the loop antenna, a spacing of 0.1 mm to 1.0 mm exists between the protection frame 411 and the antenna frame 421. Similarly, a spacing of 0.1 mm to 0.5 mm exists between the antenna frame 421 and the first conductive frame 431, and a spacing of 1 μm to 5 μm exists between the first conductive frame 431 and the second conductive frame 441.

Furthermore, the first conductive frame 431 is the ITO frame, and the second conductive frame 441 is the metallic frame.

In another embodiment of the present invention, the antenna line width 42W, the first line width 43W, and the second line width 44W are all equal.

Figure 9:
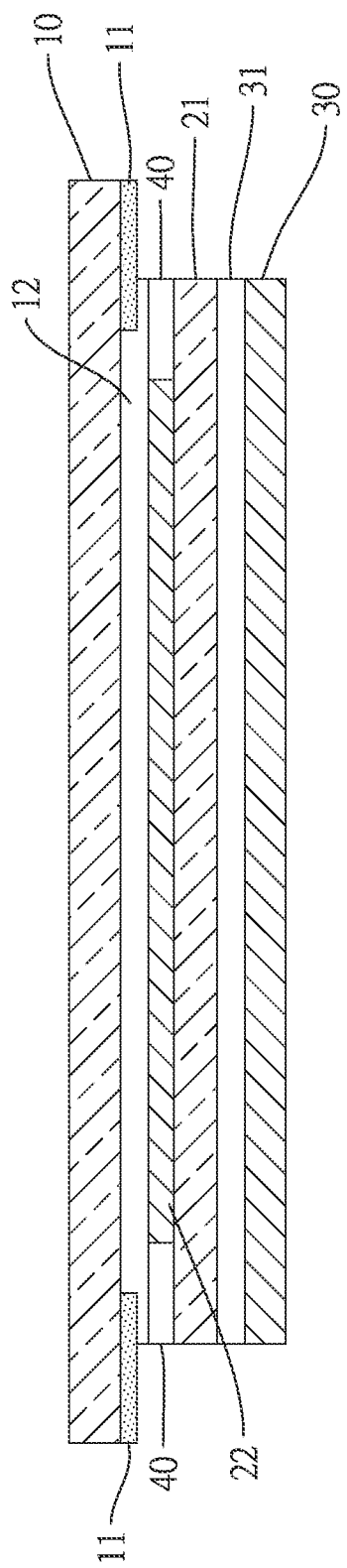
FIG. 9 is a perspective view of a fifth embodiment of the present invention.

With reference to FIG. 9, in a fifth embodiment of the present invention, the antenna module 40 is mounted on the touch module 20. More particularly, the touch sensors 22 of the touch module 20 are mounted in the protection frame 411 of the antenna module 40. Furthermore, both the antenna module 40 and the touch sensors 22 are mounted on the touch module board 21.

Figure 10:
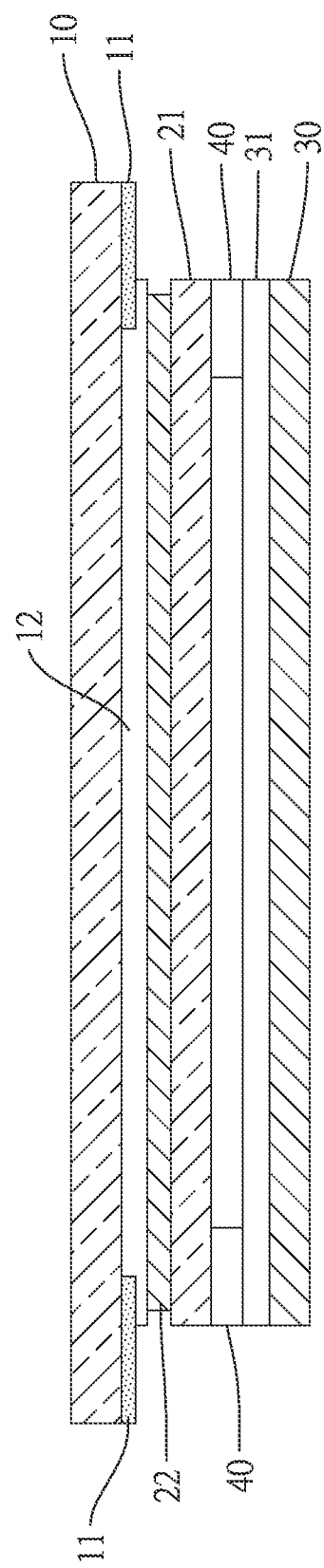
FIG. 10 is a perspective view of a sixth embodiment of the present invention.

With reference to FIG. 10, in a sixth embodiment of the present invention, the antenna module 40 is mounted on a first surface of the touch module 20, and the touch sensors 22 of the touch module 20 are mounted on a second surface of the touch module 20 opposite to the first surface. More particularly, the first surface of the touch module 20 is a surface of the touch module board 21 facing the display module 30, and the second surface of the touch module 20 is a surface of the touch module board 21 facing the cover board 10.

The touch module board 21 and the cover board 10 are both insulators, for example, glass. The protection layer 41 and the block frame 11 are also both insulators. It is important for insulators to cover and envelope the antenna layer 42, the first conductive layer 43 and the second conductive layer 44 so that oscillating electrons are confined to oscillate only within the said layers 42, 43, 44 to generate the NFC signals.

The aforementioned embodiments use the antenna module 40 to generate the NFC signals. However, in other embodiments, the antenna module 40 is free to generate electromagnetic signals in other wireless frequencies. The aforementioned embodiments only serve to demonstrate some possibilities of the present invention, rather than imposing limitations to the present invention.

Figure 11:
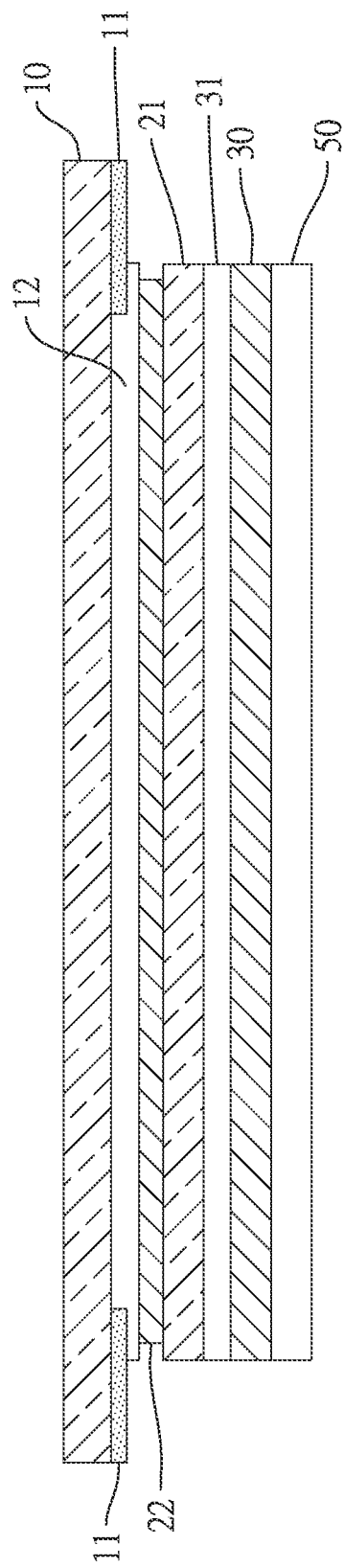
FIG. 11 is a perspective view of a seventh embodiment of the present invention.
Figure 12:
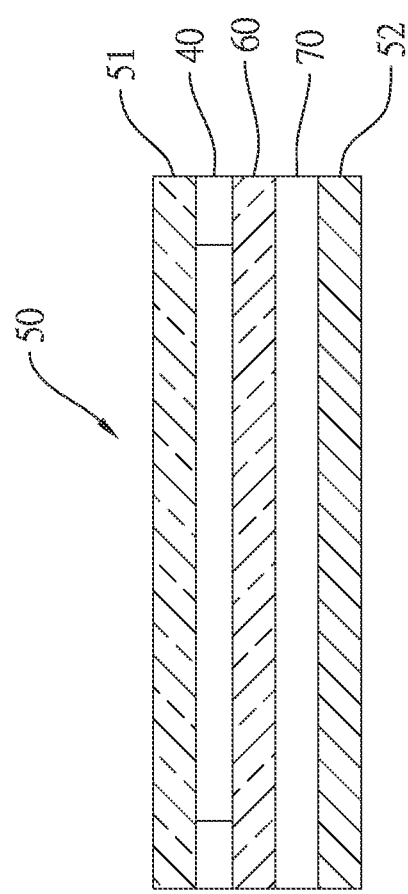
FIG. 12 is a perspective view of a backlight module in the seventh embodiment of the present invention.

With reference to FIGS. 11 and 12, a seventh embodiment of the present invention further includes a backlight module 50. The backlight module 50 is mounted below the display module 30. The backlight module 50 further includes a light source, a reflective board 51, and a metallic frame 52.

The light source emits a light for the displaying module 30. More particularly, the light source emits a backlight light source for a liquid crystal display (LCD). The reflective board 51 is mounted below the light source, and the reflective board 51 reflects the light emitted from the light source towards the display module 30. The metallic frame 52 is mounted below the reflective board 51.

The antenna module 40 further includes an antenna board 60. The antenna frame 421, the first conductive frame 431, and the protection frame 411 are mounted on the antenna board 60. The antenna module 40 is mounted between the reflective board 51 and the metallic frame 52. More particularly, the antenna module 40 is mounted on the antenna board 60, and the antenna board 60 in this embodiment is layered between the reflective board 51 and the metallic frame 52.

Furthermore, the antenna module 40 is mounted on a side of the antenna board 60 facing the reflective board 51. An electromagnetic interference (EMI) absorber layer 70 is mounted on an opposite side of the antenna board 60 facing the metallic frame 52. In other words, the EMI absorber layer 70 is mounted between the antenna board 60 and the metallic frame 52.

Figure 13:
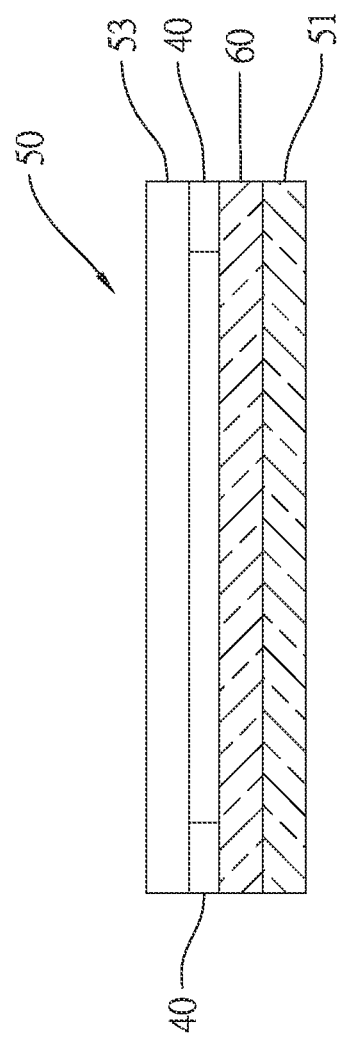
FIG. 13 is a perspective view of an eighth embodiment of the present invention.

With reference to FIG. 13, in an eighth embodiment of the present invention, the metallic frame 52 is replaced by a plastic frame 53. The plastic frame 53 is mounted below the light source, and the reflective board 51 is mounted below the plastic frame 53. The antenna module 40 is mounted between the plastic frame 53 and the reflective board 51. More particularly, the antenna board 60 is mounted between the reflective board 51 and the plastic frame 53. The antenna module 40 is mounted on a side of the antenna board 60 facing the plastic frame 53.

Figure 14:
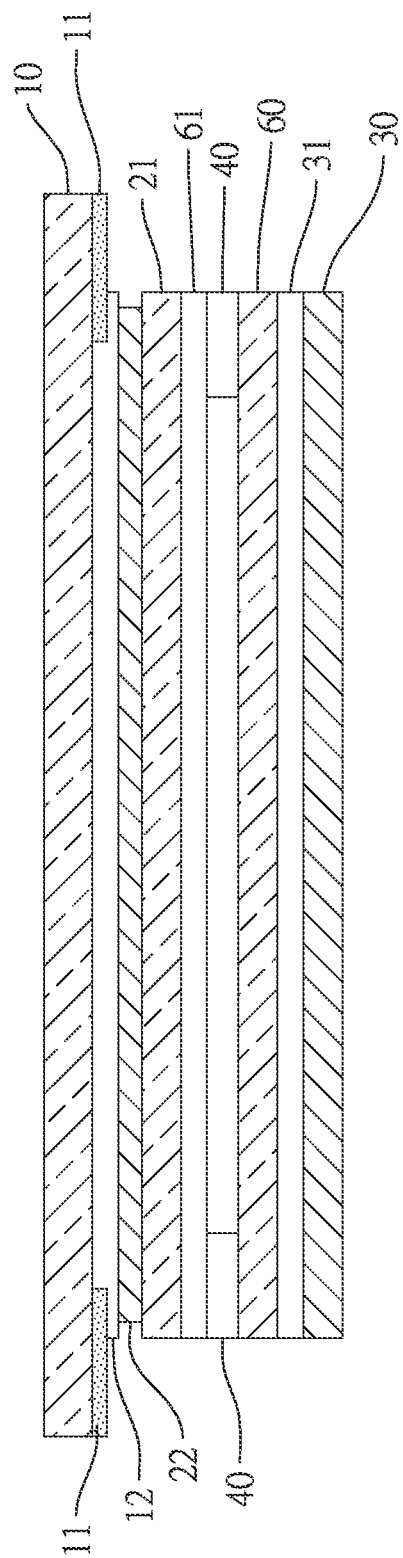
FIG. 14 is a perspective view of a ninth embodiment of the present invention.

With reference to FIG. 14, in a ninth embodiment of the present invention, the antenna board 60 is mounted between the touch module 20 and the display module 30. The touch module 20 is mounted between the antenna module 40 and the cover board 10. More particularly, the second adhesive 31 is mounted between the antenna board 60 and the display module 30. The first adhesive 12 is mounted between the cover board 10 and the touch sensors 22.

In this embodiment, the present invention further includes a third adhesive 61. The third adhesive 61 is mounted between the antenna module 40 and the touch module board 21.

Figure 15:
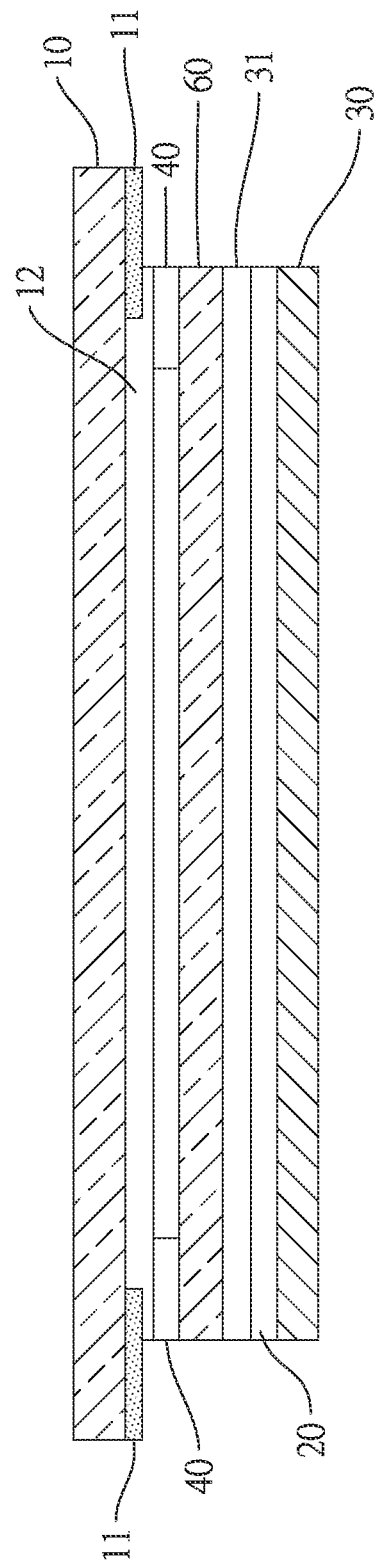
FIG. 15 is a perspective view of a tenth embodiment of the present invention.

With reference to FIG. 15, in a tenth embodiment of the present invention, the antenna board 60 is mounted between the cover board 10 and the touch module 20, and the touch module 20 is mounted between the antenna module 40 and the display module 30. More particularly, in this embodiment, the second adhesive 31 is mounted between the touch module 20 and the antenna board 60. The touch module 20 is mounted between the display module 30 and the second adhesive 31. The first adhesive 12 is mounted between the antenna module 40 and the cover board 10. The antenna module 40 is mounted between the antenna board 60 and the first adhesive 12.

Figure 16:
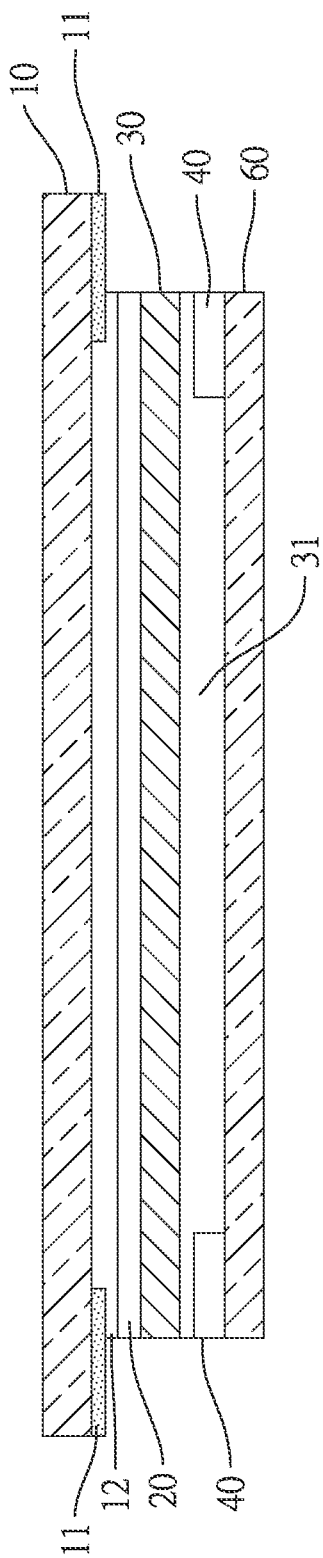
FIG. 16 is a perspective view of an eleventh embodiment of the present invention.

With reference to FIG. 16, in an eleventh embodiment of the present invention, the touch module 20 and the display module 30 are mounted between the cover board 10 and the antenna module 40. More particularly, in this embodiment, the second adhesive 31 is mounted between the antenna board 60 and the display module 30. The first adhesive 12 is mounted between the touch module 20 and the cover board 10.

Both in the tenth embodiment and the eleventh embodiment, the touch module 20 and the display module 30 are mounted together, with the touch module 20 mounted on a side of the display module 30 facing the cover board 10.

In an embodiment of the present invention, the antenna board 60 is also an insulator such as glass. In another embodiment, the antenna board 60 can be an insulator of other material.

The first adhesive 12, the second adhesive 31, and the third adhesive 61 are all transparent adhesives. In an embodiment of the present invention, these transparent adhesives are Optical Clear Adhesives (OCA). In another embodiment of the present invention, these transparent adhesives are Optical Clear Resin (OCR). In another embodiment, these transparent adhesives are a combination of OCA and OCR, as well as transparent insulating adhesive elsewise.

What is claimed is:

1. A high reliability portable device, comprising:
    a cover board;
    a touch module, layered with the cover board;
    a display module, layered with the touch module;
    an antenna module, layered with the cover board, and comprising:
        an antenna layer, having an antenna frame;
        a first conductive layer, having a first conductive frame; wherein the first conductive frame is conductive with the antenna frame; wherein the first conductive frame is tougher than the antenna frame; and
        a protection layer, having a protection frame; wherein the protection frame covers the antenna frame and the first conductive frame;
    wherein the touch module is mounted between the display module and the cover board;
    wherein the high reliability portable device further comprises:
        a first adhesive, layered between the cover board and the touch module; and
        a second adhesive, layered between the display module and the touch module;
    wherein the antenna module is mounted on a first surface of the touch module;
    wherein sensing electrodes of the touch module are mounted on a second surface of the touch module opposite to the first surface.

2. The high reliability portable device as claimed in claim 1, wherein the antenna frame is made of silver paste; and
    wherein the first conductive frame is an indium tin oxide (ITO) frame or a metallic frame.

3. The high reliability portable device as claimed in claim 1, wherein the first conductive frame has a first line width, and the antenna frame has an antenna line width;
    wherein the first line width is greater than the antenna line width.

4. The high reliability portable device as claimed in claim 1, wherein the first conductive frame has a first line width, and the antenna frame has an antenna line width;
    wherein the antenna line width is greater than the first line width, and the antenna frame covers the first conductive frame.

5. The high reliability portable device as claimed in claim 1, wherein the antenna module further comprises:
    a second conductive layer, and having a second conductive frame; wherein the second conductive frame is mounted between the antenna frame and the first conductive frame;
    wherein the protection frame further covers the second conductive frame.

6. The high reliability portable device as claimed in claim 5, wherein the second conductive frame is a metallic frame or an indium tin oxide (ITO) frame.

7. The high reliability portable device as claimed in claim 5, wherein the second conductive frame has a second line width, the first conductive frame has a first line width, and the antenna frame has an antenna line width;
    wherein the second line width is greater than the antenna line width, and the first line width is greater than the second line width.

8. The high reliability portable device as claimed in claim 5, wherein the antenna frame covers both the first conductive frame and the second conductive frame.

9. The high reliability portable device as claimed in claim 8, wherein the second conductive frame has a second line width, the first conductive frame has a first line width, and the antenna frame has an antenna line width;
  wherein the first line width is greater than the second line width, and the antenna line width is greater than the first line width.

10. The high reliability portable device as claimed in claim 1, further comprising:
  a block frame, mounted on an inner surface of the cover board; wherein the block frame is located at a rim of the cover board;
  wherein the antenna module is mounted on an inner surface of the block frame.

11. The high reliability portable device as claimed in claim 1, wherein the antenna module is mounted on the touch module;
  wherein sensing electrodes of the touch module are mounted in the protection frame of the antenna module.

12. The high reliability portable device as claimed in claim 1, wherein the antenna module comprises an antenna board, and the antenna frame, the first conductive frame, and the protection frame are mounted on the antenna board;
  wherein the antenna module is mounted between the touch module and the display module;
  wherein the touch module is mounted between the antenna module and the cover board.

13. The high reliability portable device as claimed in claim 1, wherein the first adhesive is Optical Clear Adhesive (OCA) or Optical Clear Resin (OCR).

14. The high reliability portable device as claimed in claim 1, wherein the second adhesive is Optical Clear Adhesive (OCA) or Optical Clear Resin (OCR).

15. The high reliability portable device as claimed in claim 1, wherein the antenna module comprises an antenna board, and the antenna frame, the first conductive frame, and the protection frame are mounted on the antenna board;
  wherein the antenna module is mounted between the cover board and the touch module;
  wherein the touch module is mounted between the antenna module and the display module.

16. The high reliability portable device as claimed in claim 1, wherein the antenna module comprises an antenna board, and the antenna frame, the first conductive frame, and the protection frame are mounted on the antenna board;
  wherein the touch module and the display module are mounted between the cover board and the antenna module.

* * * * *